United States Patent
Audibert et al.

(10) Patent No.: US 6,656,263 B2
(45) Date of Patent: Dec. 2, 2003

(54) LIGHTENED CEMENT SLURRIES

(75) Inventors: Annie Audibert, Croissy sur Seine (FR); Christine Noïk, Le Pecq (FR); Alain Rivereau, Rueil Malmaison (FR)

(73) Assignee: Institute Francais du Petrole, Rueil-Malmaison Cedex (FR)

( * ) Notice: Subject to any disclaimer, the term of this patent is extended or adjusted under 35 U.S.C. 154(b) by 0 days.

(21) Appl. No.: 09/970,775

(22) Filed: Oct. 5, 2001

(65) Prior Publication Data

US 2002/0062764 A1 May 30, 2002

(30) Foreign Application Priority Data

Oct. 9, 2000 (FR) .............................. 00 12960

(51) Int. Cl.$^7$ ................................. C04B 16/04
(52) U.S. Cl. ................. 106/696; 106/724; 106/737; 106/822; 106/823; 524/2; 524/3
(58) Field of Search ................. 106/724, 737, 106/696, 822, 823; 524/2, 3

(56) References Cited

U.S. PATENT DOCUMENTS

| 4,104,077 A | * | 8/1978 | Kobayashi et al. |
| 4,933,031 A | * | 6/1990 | Blomberg et al. .......... 106/679 |
| 5,968,555 A | * | 10/1999 | Yamaguchi ................. 424/501 |

FOREIGN PATENT DOCUMENTS

| EP | 0565987 | | 4/1993 |
| EP | 0590983 | | 9/1993 |
| EP | 0681017 | | 5/1995 |
| EP | 0936228 | | 2/1999 |
| EP | 0983976 | | 8/1999 |
| FR | 2575969 | * | 7/1986 |
| FR | 0544569 | | 11/1992 |
| WO | 9923046 | | 5/1999 |

* cited by examiner

Primary Examiner—Paul Marcantoni
(74) Attorney, Agent, or Firm—Antonelli, Terry, Stout & Kraus, LLP

(57) ABSTRACT

A lightened cement slurry for cementation of a well includes cement, at least one mineral filler, water, and resin particles obtained by polymerization from vinyl aromatic, alkyl acrylate or acrylic monomers, wherein the polymerization includes crosslinking.

10 Claims, 1 Drawing Sheet

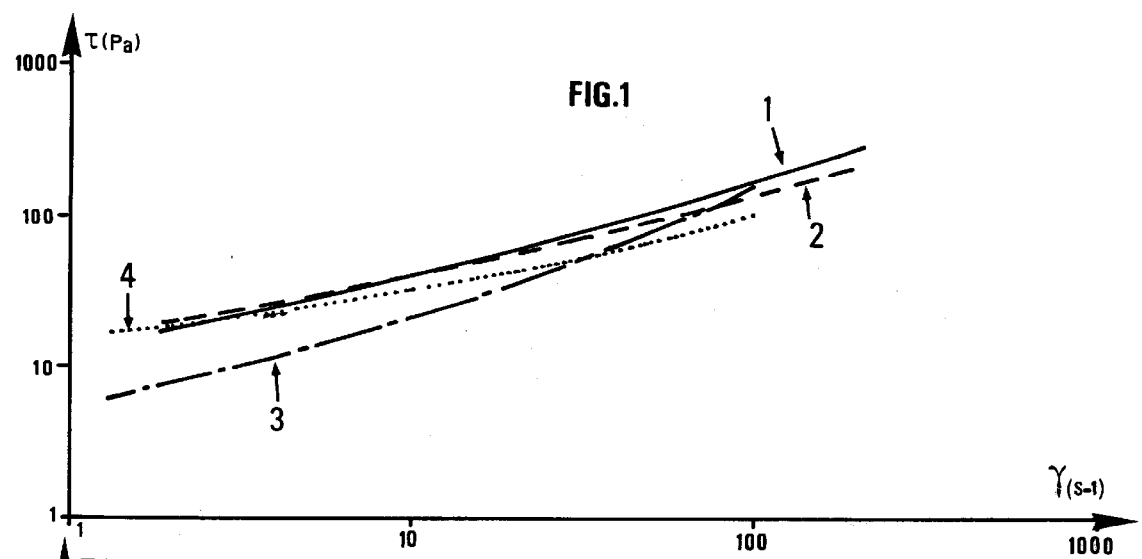
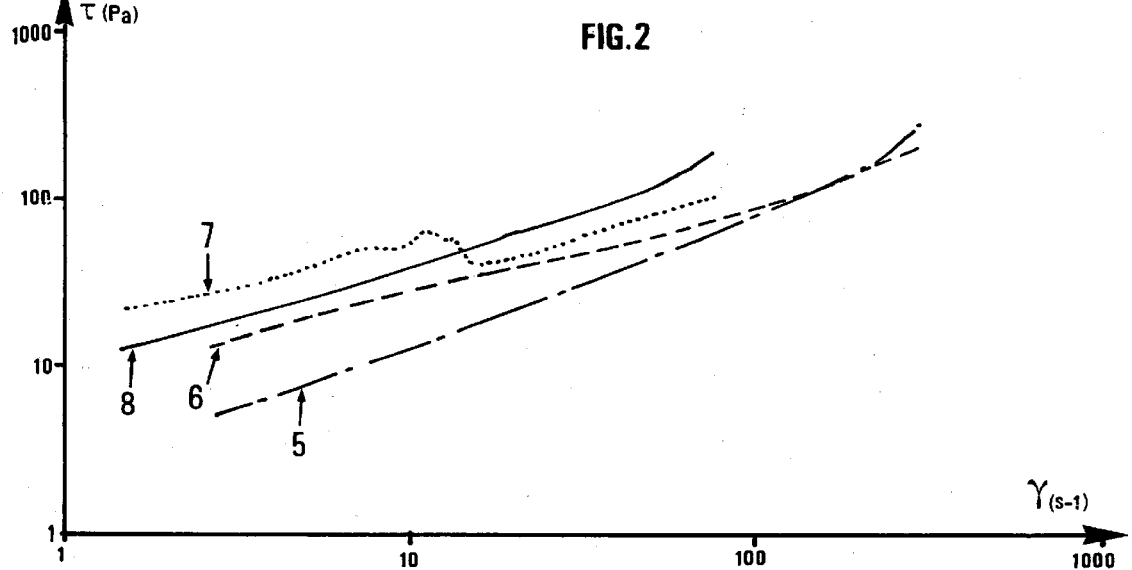
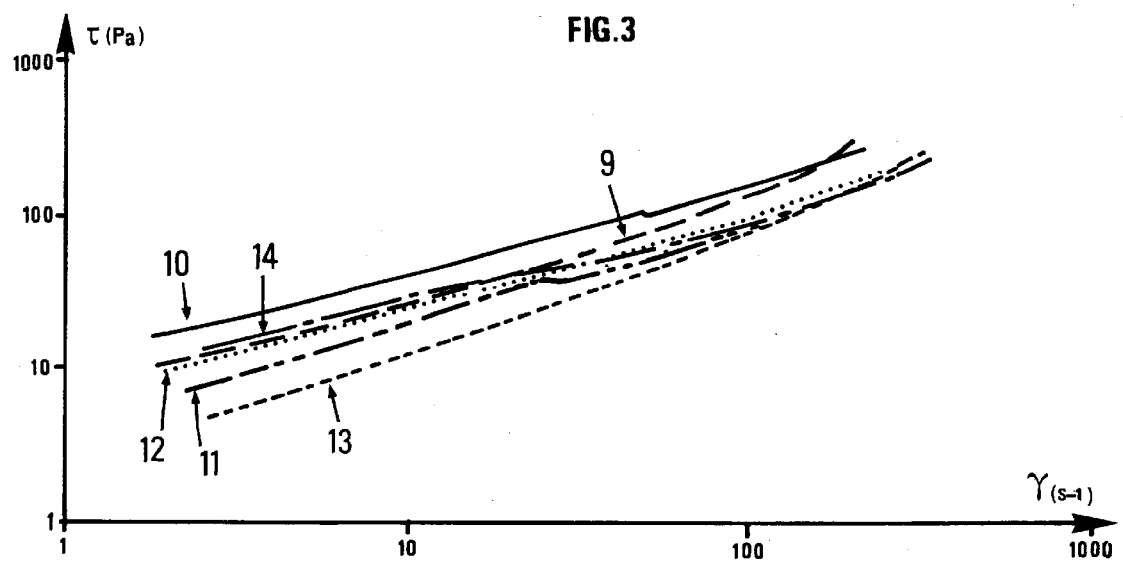

LIGHTENED CEMENT SLURRIES

FIELD OF THE INVENTION

The present invention notably relates to operations carried out in order to develop underground reservoirs containing hydrocarbons. Cementing generally requires injection by pumping of a cement slurry circulating in tubes from the surface. The aim is to cement the annular space defined between the outside of the casing pipe and the wellbore.

BACKGROUND OF THE INVENTION

Conventional cement slurries generally have a density above 1800 kg/m$^3$. Specific operations such as deep-sea drilling require high-performance grouts with a low density. The most conventional method for lightening the slurry consists in increasing the water/cement ratio (referred to as E/C in the description hereafter), which is however done to the detriment of the mechanical properties of the material once solidified. The minimum density of a slurry that can be reached by increasing the E/C ratio, without cohesion loss of the cement matrix, ranges, according to authors, between 1260 kg/m$^3$ and 1450 kg/m$^3$. Another way of lightening cement grouts consists in adding low-density materials to a conventional slurry formulation, such as coal powder, gilsonite, walnut shells.

Document U.S. Pat. No. 5,252,128 describes a mixture of cement, styrene/butadiene resin and alkyl phenol surfactant, containing 5 to 30% by weight of resin in relation to the cement, which allows good control of the filtration properties of the slurry.

Document U.S. Pat. No. 4,721,160 describes a mixture of cement and styrene/butadiene resin containing a very high proportion of water (70%), allowing to obtain a lightened cement whose density ranges between 1.2 and 1.6.

It has also been shown that an optimization of the grain size of the various constituents allows to obtain mixtures with a wide density range.

Patent WO-99/23,046 describes an oilwell cement of very low permeability and high mechanical strength based on cement, silica and microsilica. The slurries thus obtained have a density of about 2.3.

SUMMARY OF THE INVENTION

The object of the present invention is to associate with cement particles a resin (VASA) obtained by polymerization from vinyl aromatic, alkyl acrylate, acrylic type monomers, more or less crosslinked, of density 1.03, and with a grain size below 100 μm (80% of the particles ranging between 0.1 and 100 μm).

This VASA resin is organosoluble, i.e. the particles do not solubilize in the slurry water, but they remain in form of a dispersion mixed with the other particles. The VASA resin is notably characterized by:
  a glass-transition temperature above 55° C.,
  when the resin is in solution in xylene at 10%, this solution has a Brookfield viscosity above 80 Pa.s.

According to the invention, the VASA resin acts as a particulate filler that is chemically inert towards the other constituents of the slurry: binders, additives, fillers, water.

It can preferably be a <<Pliolite>>™ type resin marketed by Good Year. This resin is used in the examples described hereafter.

At least one dispersing polymer derivative or, in particular, a hydrophilic/hydrophobic type dispersing polymeric additive is also preferably associated. This allows lightening of the mixture, as well as perfect dispersion of the organophilic particles in the other particles, and good control of the mixture rheology.

The dispersing polymer can be a polymer with hydrophilic (Hy) and hydrophobic (Hb) units in aqueous solution, the hydrophobic units (Hb) containing C1 to C30 alkyl, aryl, alkyl-aryl groups, the polymer having the following structure: —(Hb)—(Hy)— with a statistical distribution, and Hy has the following form:

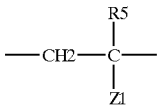

where R5 is H or CH3, Z1 is COOH or CONH2 or CONHR1SO3⁻ or CONHR"1, R"1 is CH3;

Hb has the following form:

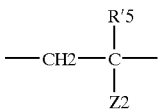

where R'5 is H or CH3 and Z2 is COOR7, C6H4SO3H, COOR'1, CONR1R'1 or CONR1R7, R7 being a nonionic surfactant consisting of an alkyl polyoxyethylene chain, R1 is H or a C1–C30 alkyl, aryl or alkyl-aryl radical, and R'1 is a C1–C30 alkyl, aryl or alkyl-aryl radical.

According to a variant, the polymer can have a molecular mass ranging between 10$^4$ and 5 10$^6$ daltons and a proportion of hydrophobic units Hb ranging between 0.5 and 60%.

The dispersing polymer can be selected from the group consisting of:
  HMPAM where R5 is H and Z1 is CONH2, R'5=CH3, Z2 is COOR'1 with R'1=C9H19,
  S1 where R5 is H and Z1 is CONH2, R'5=H and Z2 is C6H4SO3H,
  HB1 where R5 is H, Z1 is COOH, R'5 is H and Z2 is COOR'1 with R'1 is C4.

In particular, the polymer called HMPAM can have a molecular mass ranging between 5 10$^5$ and 2 10$^6$ daltons, and a proportion of hydrophobic units (Hb) ranging between 0.5 and 3%.

Polymer S1, an acrylamide (Hy)/styrene sulfonate (Hb) copolymer, branched or not, according to the description above, can have a molar ratio of about 50/50 and a molar mass ranging between 5 10$^5$ and 5 10$^6$ daltons. If it is branched, it is referred to as S2. The branching agent used in this case can be N, N' methylene bis acrylamide MBA.

Polymer HB1, an acrylate (Hy)/butyl acrylate (Hb) copolymer, where R5 is H, Z1 is COOH, R'5 is H and Z2 is COOR'1 where R'1 is C4, can comprise about 80% acrylate units, and its molecular mass can range between 10$^4$ and 5 10$^4$ daltons.

The slurry according to the invention can have the following composition: 10 to 20% silica, 10 to 15% microsilica, 30 to 60% VASA resin, 0.5 to 5% hydrophobic polymer, 30 to 50% water, these percentages being expressed in relation to the weight of cement.

Preferably, the slurry can comprise about 15% silica, 12% microsilica, 50% VASA resin, 1 to 3% hydrophobic polymer and 40 to 45% water.

In a variant, the slurry can have the following composition: 10 to 20% silica, 10 to 15% microsilica, 30 to 60% VASA resin, 80 to 95% water, and no dispersing polymer.

BRIEF DESCRIPTION OF THE DRAWINGS

Other features and advantages of the present invention will be clear from reading the description of the non-limitative examples hereafter, with reference to the accompanying drawings wherein:

FIGS. 1, 2, 3 show the rheological curves of various lightened cement slurry formulations.

DETAILED DESCRIPTION

In the following tests, the solid fillers are dry mixed; the liquid additives are prepared in aqueous solution and the mixture thereof is homogenized in a mixer for some minutes at low speed, then for 35 seconds at high speed. According to mixtures, the latter can be homogenized at low speed for about 20 minutes.

The pumpability time is defined as the time required for setting of a cement slurry in a well by circulation. The pumpability time must be at least two hours.

The stress τ—shear γ curves are obtained at a temperature T (° C.).

The compressive strength is measured at a temperature T (° C.) on samples aged at a given temperature (° C.) for a certain number of days.

The filtered volume, given in milliliter, is measured according to the API (American Petroleum Institute) standards. The standards in use are API SPEC 10-88, Section 5 (slurry preparation), Section 9 (Consistometer measuring), Appendix F-Filtration.

Additives Used:

CFR 3: dispersing additive marketed by the Halliburton company;

HR 15: modified lignosulfonate (setting retarder additive marketed by the Halliburton company);

Disal: polynaphthalene sulfonate (dispersing additive marketed by the Handy Chemicals company);

HB1: hydrophilic/hydrophobic copolymer type dispersing additive.

The associated mineral fillers can be silica C4 (Sifraco company) with a grain size ranging between 5 and 200 μm (D50 about 33 μm), silica MST (microsilica) with a grain size ranging between 1 and 50 μm (D50~7 em).

A resin used can be a vinyl acrylate, styrene acrylate type resin, more or less crosslinked, of density 1.03, with a grain size below 100 μm. It is used in form of crosslinked spherical particles and it is obtained by polymerization in emulsion of vinyl aromatic, alkyl acrylate, acrylic type monomers, possibly with addition of a difunctional monomer acting as a crosslinking agent.

| Slurry 1: |
|---|
| 100 g class G cement, |
| 20 g silica C4, |
| 24 g silica fume MST, |
| 1.75 g Disal, |
| 30 ml demineralized water, |
| density = 2.17, |
| E/C = 0.27. |

| HP/HT filtration of slurry 1 at 90° C.: | | | | |
|---|---|---|---|---|
| HB1 concentration (%) | 1 | 3 | 4 | 5 |
| HP/HT filtered volume (ml) in 30' | 35 | 22 | 5 | <3 |

| Setting time at 80° C. and 500 bars: | | |
|---|---|---|
| HB1 concentration (%) | 0 | 4 |
| T in h | 3 h 26 min | 90 min |

Slurry 1 has a conventional density (d=2.17), the addition of hydrophilic/hydrophobic copolymer HB1 allows to improve the dispersion of the mixture and to reduce the filtered volume.

The base of this slurry 1 is taken while adding a certain proportion of VASA resin with a minimum amount of water, so as to obtain the lowest density.

| Slurry 2: |
|---|
| 100 g class G cement, |
| 15 g silica C4, |
| 12 g silica fume MST, |
| 50 g VASA resin, |
| x g Disal, |
| y g HB1, |
| 42.5 cc demineralized water, |
| d = 1.56, |
| E/C = 0.43. | x and y are the weight of the active substance.

FIGS. 1, 2 and 3 show the rheological curves of slurries 2 according to various temperature conditions and compositions (x and y).

| FIG. 1: | | | |
|---|---|---|---|
| Curves | Temperatures (° C.) | x (g) | y (g) |
| 1 | 20 | 1.8 | 0 |
| 2 | 40 | 1.8 | 0 |
| 3 | 20 | 2.4 | 0 |
| 4 | 40 | 2.4 | 0 |

These rheological curves show that these compositions have too high rheologies for a cement slurry, notably for low shears.

| FIG. 2: | | | |
|---|---|---|---|
| Curves | Temperatures (° C.) | x (g) | y (g) |
| 5 | 20 | | 3 |
| 6 | 40 | | 3 |
| 7 | 20 | 1.8 | 3 |
| 8 | 40 | 1.8 | 3 |

It can be noted that the addition of an amount of HB1 to the formulation of slurry 2 allows to obtain an acceptable rheology for a cement slurry.

FIG. 3:

| Curves | Temperatures (° C.) | x (g) | y (g) |
|---|---|---|---|
| 9 | 20 | 0 | 1 |
| 10 | 40 | 0 | 1 |
| 11 | 20 | 0 | 2 |
| 12 | 40 | 0 | 2 |
| 13 | 20 | 0 | 3 |
| 14 | 40 | 0 | 3 |

The use of HB1 allows to optimize the rheology of the mixture and thus to meet the requirements. The optimum properties are obtained with about 3% HB 1.

| Compressive strength (bar) of slurry 2, without DISAL (x = 0): | | | |
|---|---|---|---|
| HB1 (g) | 1 g | 2 g | 3 g |
| 1 week | — | — | 110 |
| 6 weeks | 477 | 361 | 251 |

(at ambient temperature)

HP/HT Filtration at 90° C.:
HP/HT volume filtered in 30 minutes: 3.5 ml.
Comparatively, a conventional mixture based on class G cement and microsilica, with a high water content (E/C= 0.94), has, under the same conditions, a compressive strength of 65 bars, a filtered volume of 25 ml in 30 minutes, but above all a free water volume of 1.5%, which indicates a high sedimentation risk.

Also, a mixture of class G cement and of bentonite with a high water content (E/C=0.94) has a low compressive strength (of the order of 30 bars) measured under the same conditions.

| Slurry 3: |
|---|
| 100 g class G cement, |
| 15 g silica C4, |
| 10 g silica fume MST, |
| 50 g VASA resin, |
| 0 g Disal, |
| 90 ml demineralized water, |
| d = 1.47, |
| E/C = 0.9. |

This slurry contains a higher proportion of water and no dispersant. However, it does not sediment because of the nature of the particles, but the cement once hardened has a compressive strength of 42 bars after 2 days at 20° C., which is relatively low.

| Slurry 4: |
|---|
| 100 g class G cement, |
| 15 g silica C4, |
| 10 g silica fume MST, |
| 50 g VASA resin, |
| 1.8 g Disal, |
| 90 ml demineralized water, |
| d = 1.48, |
| E/C = 0.9. |

This mixture decants almost immediately. The Disal type dispersant is incompatible with such a formulation.

These various tests thus show that the combined use of resin and of dispersing product in suitable proportions allows to obtain cement slurries with a low water content, which do not sediment and which have, once hardened, a satisfactory compressive strength.

What is claimed is:

1. A lightened cement slurry, characterized in that it comprises: cement, at least one mineral filler, water, and resin particles obtained by polymerization from vinyl aromatic, alkyl acrylate or acrylic monomers, wherein the polymerization includes crosslinking.

2. A slurry as claimed in claim 1, wherein the resin particles have a density of about 1.03 and a grain size below 100 μm.

3. A slurry as claimed in claim 2, wherein said resin particles have a grain size such that 80% of the particles range between 0.1 and 100 μm.

4. A slurry as claimed in claim 1, wherein a dispersing polymer having hydrophilic and hydrophobic units is added.

5. A slurry as claimed in claim 4, wherein said polymer is a polymer with hydrophilic (Hy) and hydrophobic (Hb) units in aqueous solution, the hydrophobic units (Hb) containing C1–C30 alkyl, aryl or alkyl-aryl groups, the polymer having the following structure: —(Hb)—(Hy)— with a statistical distribution, and:

Hy has the following form:

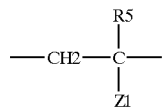

where R5 is H or CH3, and Z1 is COOH or CONH2 or CONHR1SO3⁻, or CONHR"1, R"1 is CH3;

Hb has the following form:

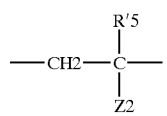

where R'5 is H or CH3 and Z2 is COOR7, C6H4SO3H, COOR'1, CONR1R'1 or CONR1R7, R7 being a non-ionic surfactant consisting of an alkyl polyoxyethylene chain, R1 is H or a C1–C30 alkyl, aryl or alkyl-aryl radical, and R'1 is a C1–C30 alkyl, aryl or alkyl-aryl radical.

6. A slurry as claimed in claim 5, wherein the polymer has a molecular mass ranging between $10^4$ and $5·10^6$ daltons and a proportion of hydrophobic units Hb ranging between 0.5 and 60%.

7. A slurry as claimed in claim 5, wherein the dispersing polymer can be selected from the group consisting of:
HMPAM, where R5 is H and Z1 is CONH2, R'5=CH3 and Z2 is COOR'1 with R'1=C9H 19,
S1, where R5 is H and Z1 is CONHR2, R'5=H and Z2 is C6H4SO3H,
HB1, where R5 is H, Z1 is COOH, R'5 is H and Z2 is COOR'1 with R'1 being C4.

8. A slurry as claimed in claim 1, comprising the following composition: 10 to 20% silica, 10 to 15% microsilica, 30 to 60% said resin particles, 0.5 to 5% dispersing polymer, 30 to 50% water, the percentages being expressed in relation to the weight of cement.

9. A slurry as claimed in claim 8, comprising about 15% silica, 12% microsilica, 50% said resin particles, 1 to 3% dispersing polymer, 40 to 45% water.

10. A slurry as claimed in claim 1, comprising the following composition: 10 to 20% silica, 10 to 15% microsilica, 30 to 60% said resin particles, 80 to 95% water, and no dispersing polymer.

* * * * *